(12) United States Patent
Good (10) Patent No.: US 6,988,545 B2
(45) Date of Patent: Jan. 24, 2006

(54) HEAT EXCHANGER SYSTEMS

(76) Inventor: Harold Max Good, 5633 N. 17th St., Phoenix, AZ (US) 85016-2914

( * ) Notice: Subject to any disclaimer, the term of this patent is extended or adjusted under 35 U.S.C. 154(b) by 46 days.

(21) Appl. No.: 10/766,453

(22) Filed: Jan. 27, 2004

(65) Prior Publication Data

US 2004/0188058 A1    Sep. 30, 2004

Related U.S. Application Data

(60) Provisional application No. 60/443,212, filed on Jan. 27, 2003.

(51) Int. Cl.
*F28F 1/04* (2006.01)
(52) U.S. Cl. .................... 165/173; 165/177
(58) Field of Classification Search ............. 165/172, 165/173, 175, 177, 110, 910, 151, 153; 34/86
See application file for complete search history.

(56) References Cited

U.S. PATENT DOCUMENTS

| | | | | |
|---|---|---|---|---|
| 895,205 A | * | 8/1908 | Schell | 165/149 |
| 989,185 A | * | 4/1911 | Onions et al. | 165/153 |
| 1,618,485 A | * | 2/1927 | Skinner | 165/151 |
| 4,117,884 A | * | 10/1978 | Frei | 165/175 |
| 4,513,811 A | * | 4/1985 | Lesniak | 165/173 |
| 4,930,571 A | * | 6/1990 | Paull | 34/86 |
| RE33,528 E | * | 1/1991 | Doty | 165/173 |
| 5,117,563 A | * | 6/1992 | Castonguay | 34/86 |
| 5,417,278 A | * | 5/1995 | Pipher et al. | 34/86 |

* cited by examiner

*Primary Examiner*—Theresa J. Walberg
(74) *Attorney, Agent, or Firm*—Stoneman Law Offices, Ltd.; Martin L. Stoneman; Benjamin K. Erlick

(57) ABSTRACT

A heat exchanger system, for transferring waste heat from a stream of exhaust air produced in a dryer to a stream of fresh air directed to flow into the dryer, including a retriever, or retriever, comprising an array of a plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air into the dryer. Associated structure for housing the retriever, supporting it in the flow of fresh air, and directing dryer exhaust air into the heat-transfer conduits is also included. The heat exchanger system is adaptable to a wide variety of dryers, and may be built-in.

20 Claims, 5 Drawing Sheets

HEAT EXCHANGER SYSTEMS

The present application is related to and claims priority from prior provisional application Ser. No. 60/443,212 filed Jan. 27, 2003, entitled "HEAT EXCHANGE SYSTEM", the contents of which are incorporated herein by this reference and are not admitted to be prior art with respect to the present invention by the mention in this cross-reference section. The present application is also related to applicant's U.S. Pat. No. 4,676,007 issued Jun. 30, 1987, entitled "HEAT EXCHANGER FOR GRAIN ELEVATORS OR BINS" and applicant's U.S. Pat. No. 4,821,428 issued Apr. 18, 1989, entitled "HEAT EXCHANGER FOR GRAIN ELEVATORS OR BINS", the contents of which are herein incorporated by reference as supporting background and are not admitted to be prior art with respect to the present invention by their mention in this section.

BACKGROUND

This invention relates to heat exchanger systems. More particularly, this invention relates to providing heat exchanger systems for improved drying of agricultural products, for example, prunes, and fabrics, for example laundry, using a system of heat recovery.

Figure 1:
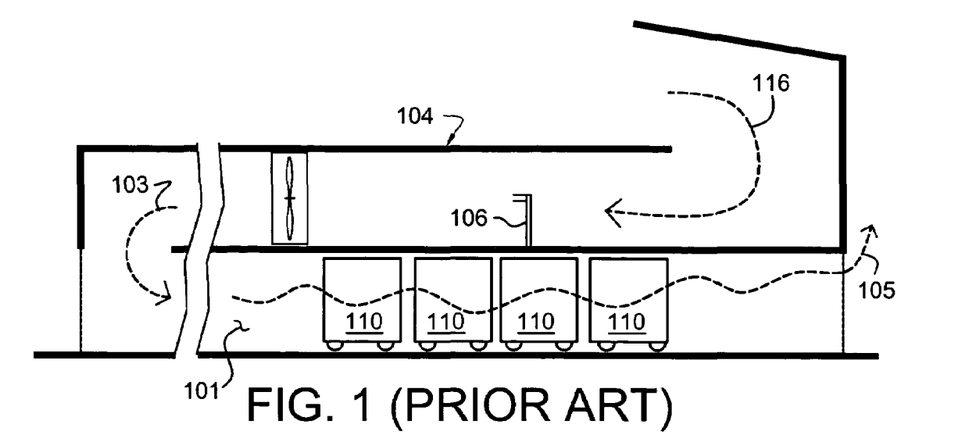
FIG. 1 is a diagrammatic sectional view of a conventional crop dryer.

Typically, tremendous amounts of heat energy are wasted in conventional crop drying techniques. Conventional drying processes use large quantities of energy to heat cold ambient air to the temperature required to dry the crop. Much of this heat/energy is wasted by the direct discharge of the hot exhaust air exiting the dryer. FIG. 1 is a diagrammatic sectional view of a conventional crop dryer 104. Typically, crop dryer 104 comprises an enclosed tunnel 101 through which heated air 103 passes to dry crop 110, as shown for, typically, the drying of prunes. In existing systems, energy is wasted by directly discharging moist, heated moist, heated exhaust air 105 from enclosed tunnel 101, as shown. Users of commercial and household laundry dryers suffer from the same waste heat losses. A need exists for a system that utilizes the large amount of thermal energy typically discarded with the exhaust air as waste.

OBJECTS OF THE INVENTION

A primary object and feature of the present invention is to provide heat exchanger systems to address the above-mentioned problems and to meet the above-mentioned needs.

A further primary object and feature of the present invention is to provide heat exchanger systems adaptable to a variety of crop dryers, laundry dryers, and other devices producing dryer exhaust containing waste heat.

A further primary object and feature of the present invention is to provide heat exchanger systems having heat-transfer conduits having large heat-transfer surface areas A further primary object and feature of the present invention is to provide heat exchanger systems having and arrangement of square heat-transfer conduits having effective flow characteristics for drying applications.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a heat exchanger system, relating to transferring waste heat from a stream of exhaust air produced in a dryer to a stream of fresh air directed to flow into the dryer, comprising: heat transfer means for substantially convectively transferring the waste heat to the stream of fresh air, comprising array means for arraying substantially vertical, substantially parallel heat-transfer conduit means for internally conducting segregated portions of the stream of exhaust air, wherein such heat-transfer conduit means comprise thermally-conductive conduit wall means for conducting heat from the segregated portions of the stream of exhaust air to the stream of fresh air, wherein such heat-transfer conduit means comprise fluid-dynamic means for influencing dynamics of the fresh air, further wherein such fluid-dynamic means comprises heat-transfer conduit means having substantially square cross-sections; and structure means for structuring a relationship between such heat transfer means and the dryer.

Moreover, it provides such a heat exchanger system, wherein such structural means comprises: base support plate means for supporting such heat transfer means; top support plate means for supporting such heat transfer means; and interconnection means for interconnecting at least two of such heat transfer means, such base support plate means, such top support plate means, and the dryer. Additionally, it provides such a heat exchanger system, wherein such fluid-dynamic means further comprises heat-transfer conduit means oriented to have one corner of such square cross-section facing the general direction of flow of the stream of fresh air through such heat transfer means. Also, it provides such a heat exchanger system, wherein such array means comprises staggered alternating rows.

In addition, it provides such a heat exchanger system, wherein such array means has dimensional relationship means comprising: external side width of such square cross section of such heat-transfer conduit means; and uniform side-to-side spacing apart of about one-half of such external side width. And, it provides such a heat exchanger system, wherein such thermally-conductive conduit wall means comprise conduit walls about 0.018" thick. Further, it provides such a heat exchanger system, wherein such thermally-conductive conduit wall means comprise aluminum. Even further, it provides such a heat exchanger system, wherein such heat-transfer means further comprises side constraining means for constraining the flow of the fresh air over such heat-transfer conduit means to move between first and second opposing sides of such heat-transfer means.

In accordance with another preferred embodiment hereof, this invention provides a heat exchanger system, related to transferring waste heat from a stream of exhaust air produced in a dryer to a stream of fresh air directed to flow into the dryer, comprising: at least one heat transferor structured and arranged to substantially convectively transfer the waste heat to the stream of fresh air, comprising at least one array structured and arranged to array substantially vertical, substantially mutually parallel plurality of heat-transfer conduits adapted to internally conduct segregated portions of the stream of exhaust air, wherein at least one heat-transfer conduit of such plurality of heat-transfer conduits comprises at least one thermally-conductive conduit wall structured and arranged to conduct heat from the segregated portions of the stream of exhaust air to the stream of fresh air, wherein such at least one heat-transfer conduit comprises at least one fluid-dynamic shape for influencing dynamics of the fresh air, further wherein such fluid-dynamic shape comprises at least one substantially square cross-section; and at least one structure configured to maintain at least one structural relationship between such heat transferor and the dryer.

Moreover, it provides such a heat exchanger system, wherein such structure comprises: at least one base support plate structured and arranged to support lower ends of such heat transferor; at least one top support plate structured and arranged to support upper ends of such heat transferor; and at least one interconnector structured and arranged to interconnect at least two of such heat transferor, such at least one base support plate, such at least one top support plate, and the dryer. Additionally, it provides such a heat exchanger system, wherein such at least one fluid-dynamic shape further comprises at least one heat-transfer conduit oriented to have one corner of such square cross-section facing the general direction of flow of the stream of fresh air through such heat transferor. Also, it provides such a heat exchanger system, wherein such at least one array comprises staggered alternating rows.

In addition, it provides such a heat exchanger system, wherein such at least one array has at least one dimensional relationship comprising: external side width of such at least one square cross section of such at least one heat-transfer conduit; and uniform side-to-side spacing apart of such plurality of such heat-transfer conduits of about one-half of such external side width of such at least one square cross section of such at least one heat-transfer conduit. And, it provides such a heat exchanger system, wherein such external side width is one-and one-half inches. Further, it provides such a heat exchanger system, wherein such at least one thermally-conductive conduit wall comprises at least one conduit wall about 0.018" thick. Even further, it provides such a heat exchanger system, wherein such at least one thermally-conductive conduit wall comprises aluminum. Moreover, it provides such a heat exchanger system, wherein such heat-transferor further comprises at least one side constraint structured and arranged to constrain the flow of the fresh air over such heat-transfer conduits to move between first and second opposing sides of such heat-transferor.

In accordance with another preferred embodiment hereof, this invention provides a heat exchanger system, relating to transferring waste heat from a stream of exhaust air produced in a dryer to a stream of fresh air directed to flow into the dryer, comprising: a retriever comprising at least one array of at least one plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air into the dryer; and at least one structure adapted to support such at least one array of such at least one plurality of heat-transfer conduits transverse to the flow of the stream of fresh air into the dryer.

Additionally, it provides such a heat exchanger system, further comprising at least one structure for assisting receiving the stream of exhaust air internal to such at least one heat-transfer conduit of such retriever. Also, it provides such a heat exchanger system, further comprising at least one retriever adapted to be integrated with at least one pre-existing particular dryer, wherein such at least one retriever further comprises such at least one structure integrated with such at least one array of heat-transfer conduits. In addition, it provides such a heat exchanger system, comprising such at least one retriever integrated with such at least one particular pre-existing dryer. And, it provides such a heat exchanger system, further comprising such at least one retriever integrated with at least one particular dryer.

In accordance with another preferred embodiment hereof, this invention provides a heat exchanger. system, relating to transferring waste heat from a stream of exhaust air produced in a dryer to a stream of fresh air directed to flow into the dryer, comprising the steps of: pre-configuring, responsive to customer requirements, at least one retriever comprising at least one array of at least one plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air through such retriever.

Further, it provides such a heat exchanger system, wherein the step of pre-configuring comprises the step of determining at least one size requirement for such at least one array. Even further, it provides such a heat exchanger system, wherein the step of pre-configuring comprises the step of perforating at least one plate with at least one pattern of a plurality of square perforations in staggered rows, each square perforation oriented cornerwise to the general direction of flow of the fresh air over the plate, responsive to such at least one size requirement. Even further, it provides such a heat exchanger system, further comprising the step of attaching such plurality of heat transfer conduits to such at least one plate, wherein each such heat transfer conduit of such plurality of heat transfer conduits is aligned and oriented to one perforation of such plurality of perforations.

Even further, it provides such a heat exchanger system, further comprising the step of attaching structural elements to at least such at least one plate, wherein such structural elements are structured and arranged to at least maintain structural integrity of such retriever. Even further, it provides such a heat exchanger system, further comprising the step of installing such retriever in at least one dryer.

DETAILED DESCRIPTION OF A PREFERRED EMBODIMENT OF THE INVENTION

Figure 2:
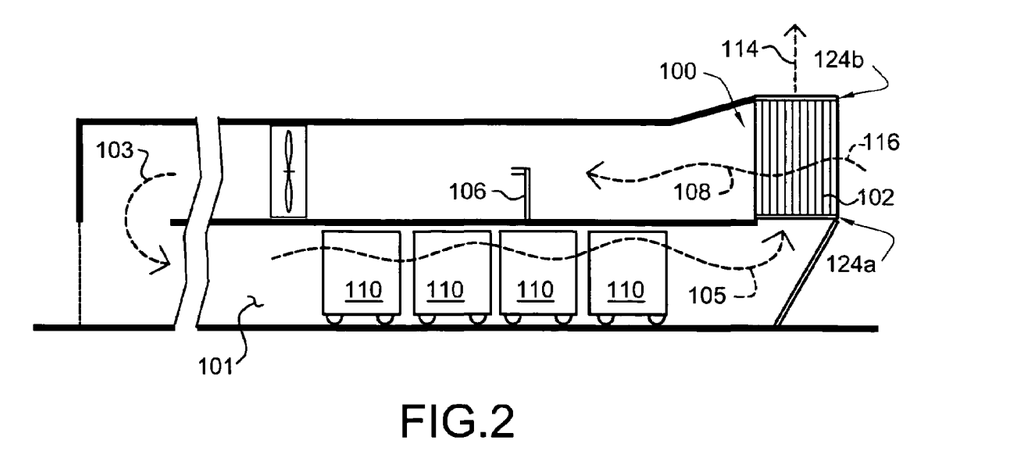
FIG. 2 is a diagrammatic sectional view of a crop dryer utilizing a heat exchanger system according to a preferred embodiment of the present invention.

FIG. 2 is a diagrammatic sectional view of crop dryer 104 utilizing heat exchanger system 100 according to a preferred embodiment of the present invention, as shown. Preferably, retriever 102 of heat exchanger system 100 acts as a pre-heater, returning wasted heat from a stream of moist, heated exhaust air 105 to the input stream of fresh air 116 that then enters the crop dryer 104 as pre-heated intake air 108, as shown (at least herein embodying heat transfer means for substantially convectively transferring the waste heat to the stream of fresh air; and at least herein embodying at least one heat transferor structured and arranged to substantially convectively transfer the waste heat to the stream of fresh air). Preferably, burner 106 of crop dryer 104 adds thermal energy to the pre-heated intake air 108 to achieve the temperature for the dryer air 103 required to dry crop 110, as shown (at least one retriever adapted to be integrated with at least one pre-existing particular dryer; and at least herein embodying retriever integrated with said at least one particular pre-existing dryer; and at least herein embodying retriever integrated with at least one particular dryer).

Heat exchanger system 100 preferably returns much of the wasted heat to crop dryer 104, as shown. Upon reading the teachings of this specification, those with ordinary skill in the art will now understand that, under appropriate circumstances, considering such issues as dryer configuration, required flow rates, convenience, economics, user preference, etc., other positions for retriever 102, such as an external position connected by ductwork, variation of position within crop dryer 104, etc., may suffice.

Figure 3:
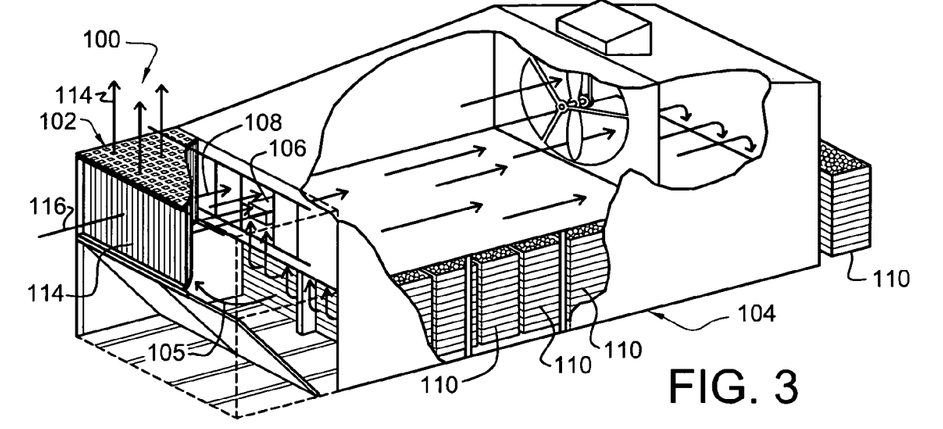
FIG. 3 is a perspective view in partial section illustrating a crop dryer utilizing the heat exchanger system according to a preferred embodiment of the present invention.

FIG. 3 is a perspective view in partial section illustrating crop dryer 104 utilizing heat exchanger system 100 according to a preferred embodiment of the present invention. Preferably, before moist, heated exhaust air 105 is allowed to leave dryer system 100, moist, heated exhaust air 105 enters retriever 102, preferably containing an array of about 600 heat-exchanging conduits 112 about six feet in length, as shown (at least herein embodying array means for arraying substantially vertical, substantially parallel heat-transfer conduit means for internally conducting segregated portions of the stream of exhaust air; and at least herein embodying at least one array structured and arranged to array substantially vertical, substantially mutually parallel plurality of heat-transfer conduits adapted to internally conduct segregated portions of the stream of exhaust air). Walls of the heat-exchanging conduits 112 are heated as moist, heated exhaust air 105 is exhausted through them into the environment as cooled exhaust air 114, as shown. Preferably, fresh air 116 entering crop dryer 104 is pulled across the exterior surfaces of the walls of the heated heat-exchanging conduits 112, thereby producing pre-heated air 108 to reduce the required energy input required at burner 106, as shown (at least herein embodying thermally-conductive conduit wall means for conducting heat from the segregated portions of the stream of exhaust air to the stream of fresh air; and at least herein embodying at least one thermally-conductive conduit wall structured and arranged to conduct heat from the segregated portions of the stream of exhaust air to the stream of fresh air). Upon reading the teachings of this specification, those with ordinary skill in the art will now understand that, under appropriate circumstances, considering such issues as dryer configuration, type of crop or material to be dried, temperature requirements, required flow rates, convenience, economics, user preference, etc., other numbers of heat-exchanging conduits 112 and other lengths of heat-exchanging conduits 112 for retriever 102, such as longer or shorter heat-exchanging conduits 112 adapted to a particular dryer configuration or more or fewer heat-exchanging conduits 112 adapted to flow rates and temperature requirements, etc., may suffice.

Figure 4:
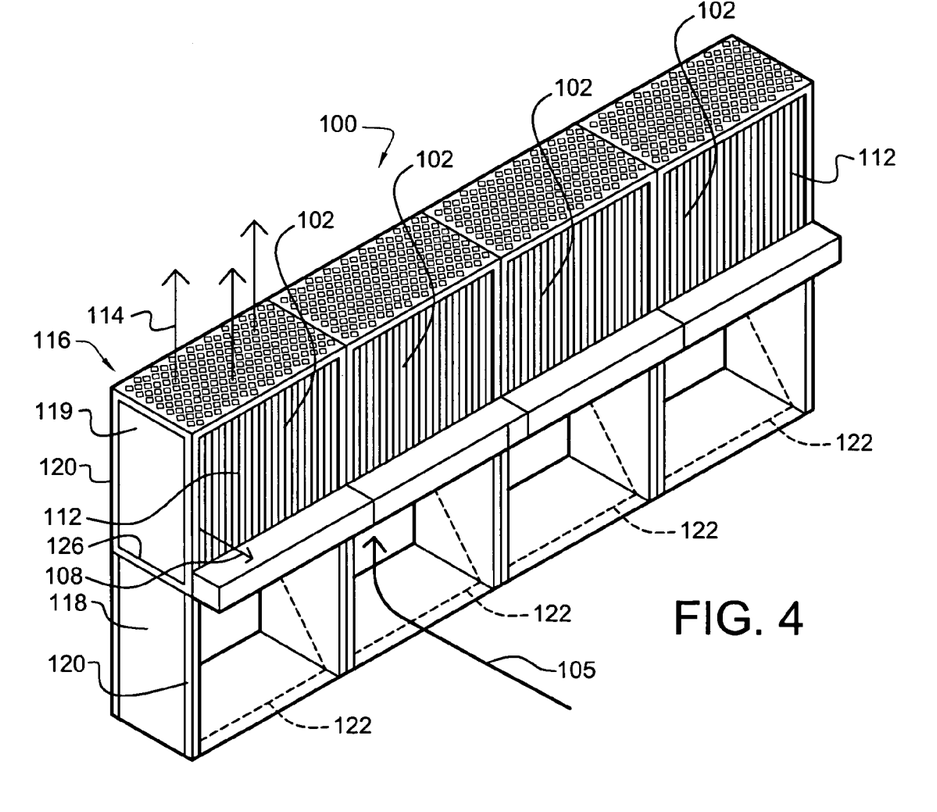
FIG. 4 is a perspective view of the heat exchanger system according to the embodiment of FIG. 3.

FIG. 4 is a perspective view of the heat exchanger system 100 according to the embodiment of FIG. 3. Preferably, a structure 120 and 126, such as rigid steel framing, supports retriever 102 in the stream of fresh air 116, as shown (at least herein embodying structure means for structuring a relationship between said heat transfer means and the dryer; and at least herein embodying at least one structure configured to structure a relationship between said heat transferor and the dryer). Preferably, structure 120 includes flow constraints 118 and 119, such as canvas sidewalls, as shown (at least herein embodying side constraining means for constraining the flow of the fresh air over said heat-transfer conduit means to move between first and second opposing sides of said heat-transfer means; and at least herein embodying at least one side constraint structured and arranged to constrain the flow of the fresh air over said heat-transfer conduits to move between first and second opposing sides of said heat-transferor). Preferably, structure 126 includes a frame for receiving the retriever 102, as shown (at least herein embodying structure means for structuring a relationship between said heat transfer means and the dryer; and at least herein embodying at least one structure adapted to support said at least one array of said at least one plurality of heat-transfer conduits transverse to the flow of the stream of fresh air into the dryer). In an alternate embodiment, retriever 102 is preferably supported, at least partially, by pre-existing structure of the crop dryer 104, as shown in FIGS. 1–2 (at least herein embodying at least one retriever adapted to be integrated with at least one pre-existing particular dryer; and at least herein embodying retriever integrated with said at least one particular pre-existing dryer; at least herein embodying retriever integrated with at least one particular dryer).

Preferably, some flow constraints are integral to the crop dryer 104, such as steel-framed pivoting canvas doors 122 which provides crop 110 access to crop dryer 104 and directs air into retriever 102, as shown (at least herein embodying structure means for structuring a relationship between said heat transfer means and the dryer; and at least herein embodying at least one structure configured to structure a relationship between said heat transferor and the dryer). In some alternate embodiments, steel-framed pivoting canvas doors 122 may be integral to structure 120, structure 126 or to retriever 102 (at least herein embodying said at least one structure integrated with said at least one array of heat-transfer conduits). In such an alternate embodiment, the canvas is preferably a PVC coated fabric having a substantially polyester plain weave substrate. Upon reading the teachings of this specification, those with ordinary skill in the art will now understand that, under appropriate circumstances, considering such issues as dryer configuration, available installation sites, type of crop 110 or material to be dried, temperature requirements, required flow rates, convenience, economics, user preference, etc., other adapted structures for supporting the retriever 102 in the stream of fresh air 116, such as more or less structure 120, adapted configurations and sizes of flow constraints 118, 119, and 122, or various adapted materials for the flow constraints 118, 119, and 122 or structure 120, etc., are included within various embodiments of the present invention adapted to specific dryer-related requirements.

Figure 5A:
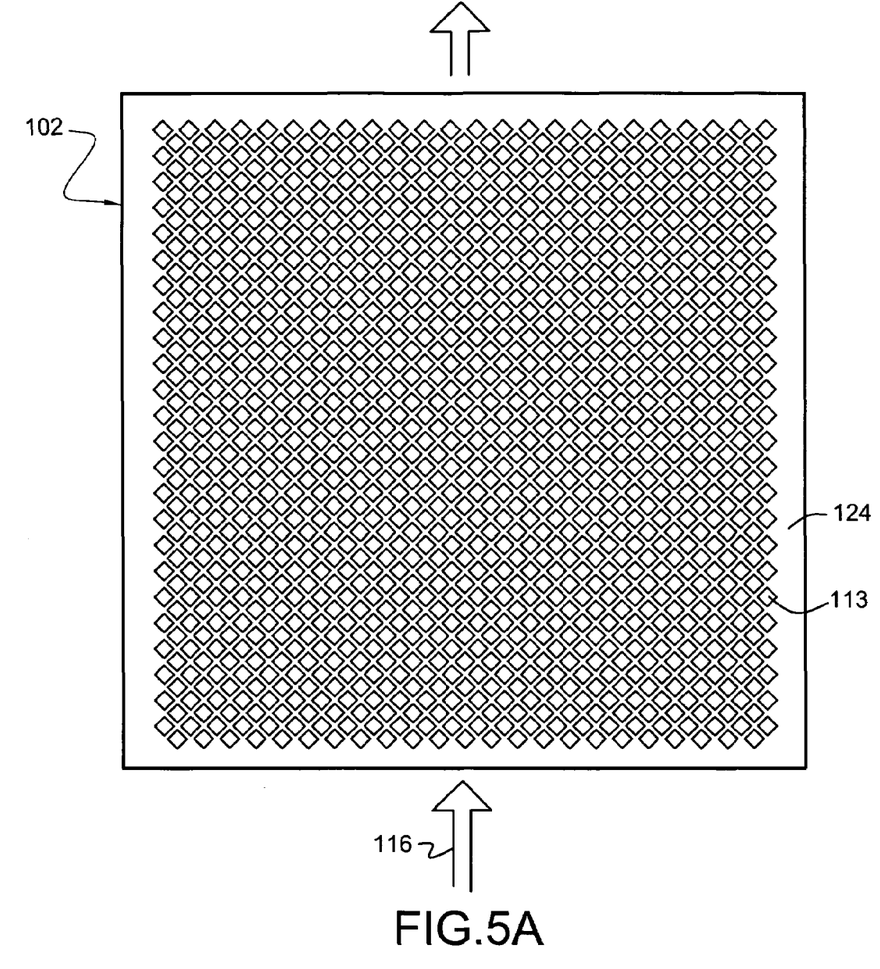
FIG. 5A is a top view of the base plate of the heat-exchanging retriever illustrating a typical layout of holes for receiving heat-exchanging conduits according to the embodiment of FIG. 3.
Figure 5B:
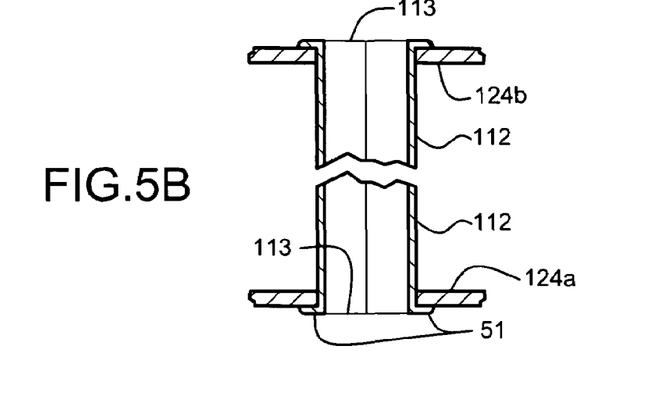
FIG. 5B is a side view of a portion of the base plate of FIG. 5A, a portion of a top plate, and a heat-transfer conduit connected there between by end-flaring according to a preferred embodiment of the present invention.

FIG. 5A is a top view of support plate 124 used as the base plate 124a and the top plate 124b of the heat-exchanging retriever 102 illustrating an exemplary layout and orientation of openings 113 for receiving the array of heat-exchanging conduits 112 according to the preferred embodiment of FIG. 3, as shown (at least herein embodying base support plate means for supporting said heat transfer means; and at least herein embodying top support plate means for supporting said heat transfer means; and at least herein embodying at least one base support plate structured and arranged to support lower ends of said heat transferor; and at least herein embodying at least one top support plate structured and arranged to support upper ends of said heat transferor). Preferably, the array of heat-exchanging conduits 112 has staggered alternating rows of square heat-exchanging conduits 112 each oriented to have a corner facing the general direction of the flow of fresh air 116 through the retriever 102, as shown (at least herein embodying fluid-dynamic means for influencing dynamics of the fresh air, further wherein said fluid-dynamic means comprises heat-transfer conduit means having substantially square cross-sections; and at least herein embodying heat-transfer conduit means oriented to have one corner of said square cross-section facing the general direction of flow of the stream of fresh air through said heat transfer means; and at least herein embodying staggered alternating rows; and at least herein embodying at least one fluid-dynamic shape for influencing dynamics of the fresh air, further wherein said fluid-dynamic shape comprises at least one substantially square cross-section; and at least herein embodying at least one heat-transfer conduit oriented to have one corner of said square cross-section facing the general direction of flow of the stream of fresh air through said heat transferor; and at least herein embodying at least one array of at least one plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air into the dryer). Preferably, the heat-exchanging conduits 112 are frictionally retained within support plates 124a and 124b by end-flaring of the aluminum heat-exchanging conduits 112, as shown in FIG. 5B (at least herein embodying the step of attaching said plurality of heat transfer conduits to said at least one plate). Structure 120 further supports plates 124a and 124b and interconnects plates 124a and 124b in relation to the array of heat-exchanging conduits 112, as shown (at least herein embodying interconnection means for interconnecting said heat transfer means, said base support plate means, and said top support plate means; and at least herein embodying at least one interconnector structured and arranged to interconnect said heat transferor, said at least one base support plate, and said at least one top support plate; and at least herein embodying wherein said at least one retriever further comprises said at least one structure integrated with said at least one array of heat-transfer conduits).

Preferably, heat-exchanging conduits 112 comprise uncoated, square aluminum tubing having a wall thickness of about 0.018", as shown (at least herein embodying substantially square cross-sections; and at least herein embodying wherein said thermally-conductive conduit wall means comprise conduit walls about 0.018" thick; and at least herein embodying wherein said at least one thermally-conductive conduit wall comprises at least one conduit wall about 0.018" thick; and at least herein embodying wherein said thermally-conductive conduit wall means comprise aluminum; and at least herein embodying wherein said at least one thermally-conductive conduit wall comprises aluminum). Preferably, to improve the heat transfer efficiency of the system, heat-exchanging conduits 112 are 1½"×1½" square, as shown (at least herein embodying external side width of said square cross section of said heat-transfer conduit means). Preferably, the spacing between heat-exchanging conduits 112 is one-half the width of the sides of heat-exchanging conduits 112, or three-quarters of an inch, as shown (at least herein embodying wherein said heat-transfer conduits are uniformly spaced-apart three-quarters of an inch side-to-side; and at least herein embodying uniform side-to-side spacing apart of said plurality of said heat-transfer conduits of about one-half of said external side width of said at least one square cross section of said at least one heat-transfer conduit; and at least herein embodying uniform side-to-side spacing apart of about one-half of said external side width). Preferably, the heat-exchanging conduits 112 are oriented such that one corner faces the general direction of flow of fresh air 116 (at least herein embodying heat-transfer conduit means oriented to have one corner of said square cross-section facing the general direction of flow of the stream of fresh air through said heat transfer means; and at least herein embodying at least one heat-transfer conduit oriented to have one corner of said square cross-section facing the general direction of flow of the stream of fresh air through said heat transferor). Applicant has found that, for such aluminum heat-exchanging conduits 112, the above preferred wall thickness provides an unexpectedly and exceptionally desirable combination of heat exchange efficiency and structural stability. Upon reading the teachings of this specification, those with ordinary skill in the art will now understand that, under appropriate circumstances, considering such issues as dryer configuration, temperature requirements, required flow rates, material costs, material heat-transfer rates, convenience, economics, user preference, etc., other materials, heat-exchanging conduit 112 sizes and relative spacing, etc., may suffice.

Figure 6:
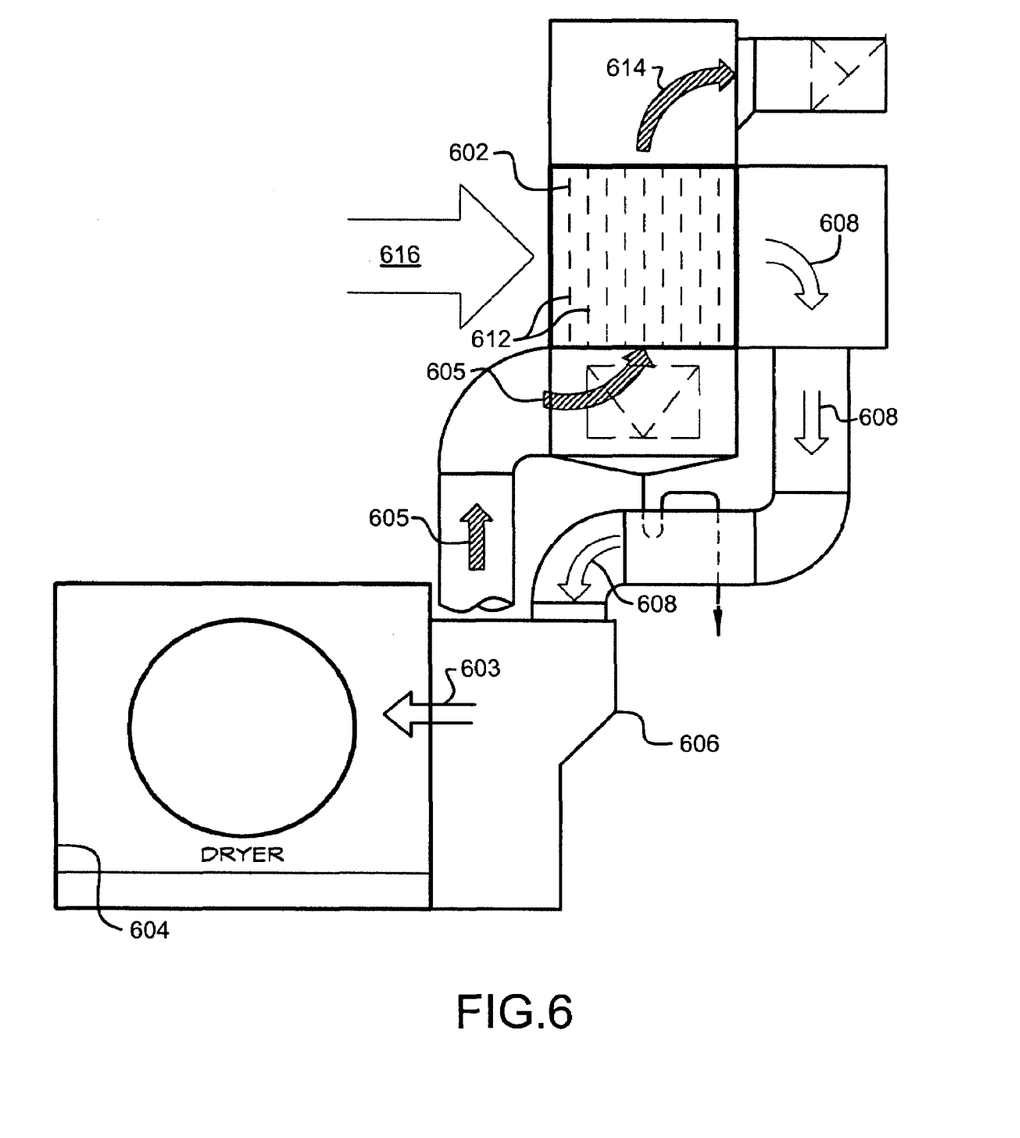
FIG. 6 is a side elevation diagrammatic view of a heat-exchanging retriever adapted for use with a laundry dryer according to a preferred embodiment of the present invention.

FIG. 6 is a side elevation diagrammatic view of a heat-exchanging system 600 showing retriever 602 pre-configured for use with a laundry dryer 604. Laundry dryer 604 produces exhaust air 605, which enters the heat-exchanging conduits 612 of retriever 602. Moist, heated exhaust air 605 heats the heat-exchanging conduits 612 which conduct the heat to outer surfaces of the heat-exchanging conduits 612, where the heat is transferred, mostly by convection, to the input stream of fresh air 616. The input stream of fresh air 616 is thereby pre-heated to become pre-heated air 608. Pre-heated air 608 is conducted to the dryer heater 606, which may include a burner or heater coil or the like, where it is heated to become dryer air 603. Upon reading the teachings of this specification, those with ordinary skill in the art will now understand that, under appropriate circumstances, considering such issues as dryer type, matter to be dried, convenience, economics, user preference, etc., other retriever 602 configurations and applications, such as a model configured for home laundry use, a model configured for drying died fabrics, a model configured for timber drying, etc., may suffice.

Preferably, heat exchanger systems 100 and 600 are easily pre-configured to be integrated to any one or more of a wide range of dryer systems, as shown. Although energy savings potential is dependent on a variety of factors (such as type of product dried, local climate, etc.), The applicant has determined through field testing that a fuel use savings of between 30 and 60 percent is possible for most drying applications.

Figure 7:
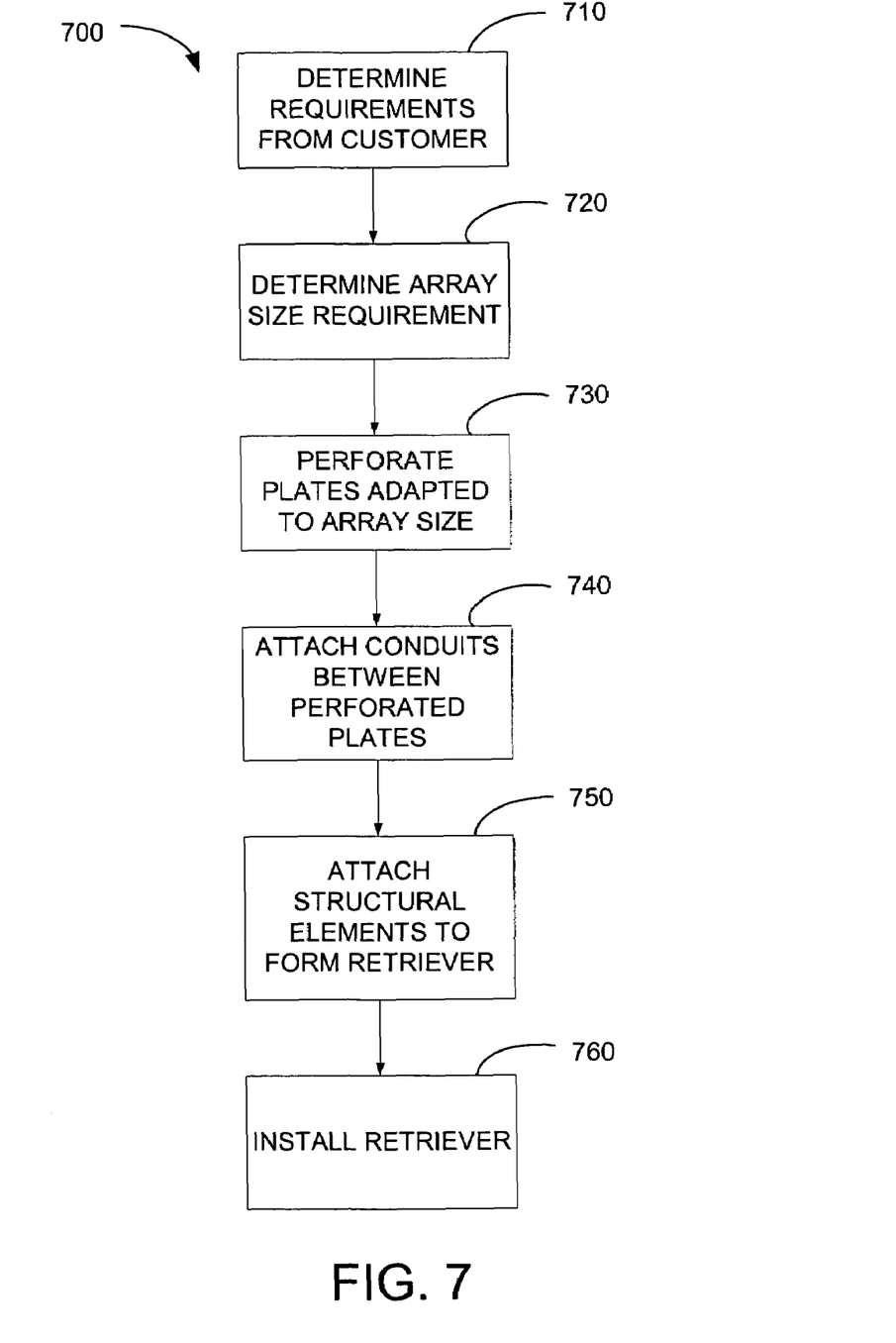
FIG. 7 is a flowchart of a heat exchanger system process according to a preferred embodiment of the present invention.

FIG. 7 is a flowchart of a heat exchanger system process 700 according to a preferred embodiment of the present invention. Process 700 preferably begins with determining 710 the requirements of the customer. Such requirements typically include moist, heated exhaust air 105 flow rates, fresh air 116 flow rates, desired temperature of drying air 103, and information about the crop or material to be dried. For example, prunes must be dried slowly in relatively humid air to prevent premature drying of the exterior surface, which may form a barrier to drying the interior of the fruit. In contrast, raisins may be dried more rapidly because they do not exhibit the dry-surface-barrier effect of prunes. Accordingly, an array size for drying prunes would typically be smaller than an array for drying raisins, given identical dryers 104. Physical size limits on the retriever 102 may also be imposed by customer requirements related to facility limitations. For example, the retriever 102 may be required to fit within pre-existing spaces or ductwork in the dryer 104. Upon reading the teachings of this specification, those with ordinary skill in the art will now understand that, under appropriate circumstances, considering such issues as dryer operational parameters, matter to be dried, convenience, economics, user preference, etc., other customer requirements, such as noise abatement, portability, materials compatibility, etc., may influence further steps of process 700.

Array size requirements are preferably determined 720 from the customer requirements, as shown (at least herein embodying determining at least one size requirement for said at least one array). Upon reading the teachings of this specification, those of skill in the art of analyzing heat transfer in fluid flows will understand how to calculate, from the customer's requirements, the desired array size for the above-disclosed preferred array of square heat-transfer conduits 112.

Preferably, once the array size requirements are determined 720, top and bottom support plates 124*a* and 124*b*, adapted to the determined 720 array size, may be perforated 730 with a pattern of square holes 113 in staggered rows with preferably each square hole 113 oriented to have a corner facing the general direction of fresh air 116 flow through the retriever 102, as shown (at least herein embodying perforating at least one plate with at least one pattern of a plurality of square perforations in staggered rows, each square perforation oriented cornerwise to the general direction of flow of the fresh air over the plate, responsive to said at least one size requirement). The holes 113 may be made by any conventional means, such as stamping, machine cutting, laser cutting, or other method that may minimize cost at the time of manufacture. The array of holes 113 is preferably centered on the support plates 124*a* and 124*b*, and the patterns of holes 113 on each plate 124*a* and 124*b* are preferably substantially identical. Upon reading the teachings of this specification, those with ordinary skill in the art will now understand that, under appropriate circumstances, considering such issues as customer requirements, materials availability, convenience, economics, user preference, etc., minor variations in shape, size, and arrangement of holes 113, adaptive to customer requirements, may suffice.

Preferably, heat-transfer conduits 112 are attached 740 to plates 124*a* and 124*b* to form a retriever 102 by extending each end of each heat-transfer conduit 112 through an aligned pair of holes 113 (one hole 113 on base plate 124*a* and one hole 113 on top plate 124*b*) and end-flaring the heat-transfer conduits 112 to secure them to the base plate 124*a* and the top plate 124*b*, as shown in FIG. 5B (at least herein embodying attaching said plurality of heat transfer conduits to said at least one plate, wherein each said heat transfer conduit of said plurality of heat transfer conduits is aligned and oriented to one perforation of said plurality of perforations; and at least herein embodying pre-configuring, responsive to customer requirements, at least one retriever comprising at least one array of at least one plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air through said retriever). In an alternate embodiment, only base support plate 124*a* is attached 740 to heat-transfer conduits 112 during manufacture, with the function of top support plate 124*b* being provided by some portion of a dryer 104 or 604. In another alternate embodiment, neither support plate 124*a* nor 124*b* is attached 740 during manufacture, with the functions of both being provided by some portion of a dryer 104 or 604. Upon reading the teachings of this specification, those with ordinary skill in the art will now understand that, under appropriate circumstances, considering such issues as, materials availability, fastener technology, convenience, economics, user preference, etc., other methods of attaching 740 heat-transfer conduits 112 to plate 124*a* and 124*b*, such as welding, gluing, fusing, bolting, screwing, etc., may suffice.

Once heat-transfer conduits 112 are attached 740 between perforated support plates 124*a* and 124*b*, structures 120 are preferably attached 750 at least between the support plates 124*a* and 124*b* to maintain structural integrity of the retriever 102 (at least herein embodying attaching structural elements to at least said at least one plate, wherein said structural elements are structured and arranged to at least maintain structural integrity of said retriever). Structures 120 are preferably made of steel. Sidewalls 119 preferably serve as additional structural support to the retriever 102 as well as side constraints for the flow of fresh air 116 through the retriever 102. Sidewalls 119 are preferably made of a rigid material, more preferably a lightweight rigid material, and most preferably fiberglass. In an alternate embodiment, sidewalls 119 are made of a flexible, wind-resistant fabric, preferably canvas, and attach to structures 120.

Additional structure 120 is preferably used to position and support retriever 102 in the flow of fresh air 116. For example, structure 120 may be used to elevate retriever 102 to engage the flow of fresh air 116 into dryer 104 as shown in FIG. 4. Preferably, additional structure 118 assists in directing moist, heated exhaust air 105 into the retriever 102. Structure 118 is preferably made of a rigid material, more preferably a lightweight rigid material, and most preferably fiberglass. Preferably, structure 126 supports the bottom edge of retriever 102. Structure 126 is preferably made of steel. The methods of attachment 750 are preferably adapted to the various materials of structures 118, 119, 120, and 126. Preferably the steel is welded, more preferably bolted. Preferably the fiberglass is attached to steel with bolts, less preferably with screws, still less preferably with glue. Upon reading the teachings of this specification, those with ordinary skill in the art will now understand that, under appropriate circumstances, considering such issues as, materials availability, fastener technology, convenience, economics, user preference, etc., other methods of attaching 750 structures 118, 119, 120, and 126 to each other, such as riveting, clamping, pressing, etc., may suffice.

Once the retriever 102 has the necessary structure 118, 119, 120, and 126 attached 750, the retriever 102 is preferably installed 760 in relation to a dryer 104, as shown (at least herein embodying installing said retriever in at least one dryer). Installation 760 is preferably near enough to dryer 104 to connect by structure 118, 119, and 120, which preferably includes ductwork, more preferably directly adjacent to dryer 104, and most preferably within dryer 104. In some alternate embodiments, the retriever 102 is built-in to a dryer 104 during manufacture of the dryer 104, wherein some or all structure 118, 119, 120, and 126 is preferably common to the retriever 102 and the dryer 104. For example, the retriever 102 shown in FIG. 2 could have been built in at the time the dryer 104 was constructed. Upon reading the teachings of this specification, those with ordinary skill in the art will now understand that, under appropriate circumstances, considering such issues as, dryer configuration, facility configuration, convenience, economics, user preference, etc., other relationships of the retriever 102 to dryer 104, such as over, under, beside, integral with the burner 106, integral with a fresh air 116 inlet vent, vehicle-mounted transportable with at least partially flexible ductwork, integral with an exhaust air 114 fan (not shown), etc., may suffice.

Although applicant has described applicant's preferred embodiments of this invention, it will be understood that the broadest scope of this invention includes such modifications as diverse shapes and sizes and materials. Further, many other advantages of applicant's invention will be apparent to those skilled in the art from the above-disclosed matters.

What is claimed is:

1. A heat exchanger system, relating to transferring waste heat from a stream of exhaust air produced in a dryer to a stream of fresh air directed to flow into the dryer, comprising:
   a) at least one heat transferor structured and arranged to substantially convectively transfer the waste heat to the stream of fresh air,
   b) wherein said at least one heat transferor comprises at least one array structured and arranged to array substantially vertical, substantially mutually parallel plurality of heat-transfer conduits adapted to internally conduct segregated portions of the stream of exhaust air,
   c) wherein at least one heat-transfer conduit of said plurality of heat-transfer conduits comprises at least one thermally-conductive conduit wall structured and arranged to conduct heat from the segregated portions of the stream of exhaust air to the stream of fresh air,
   d) wherein said at least one heat-transfer conduit comprises at least one substantially square cross-section; and
   e) wherein said at least one substantially square cross-section is oriented to have one corner of said at least one substantially square cross-section facing the general direction of flow of the stream of fresh air through said at least one heat transferor.

2. The heat exchanger system according to claim 1, further comprising the dryer.

3. The heat exchanger system according to claim 1, wherein said at least one array comprises staggered alternating rows of said at least one heat-transfer conduit comprising said at least one substantially square cross-section oriented to have one corner of said at least one substantially square cross-section facing the general direction of flow of the stream of fresh air through said at least one heat transferor.

4. The heat exchanger system according to claim 1, wherein said at least one array comprises at least five staggered alternating rows.

5. The heat exchanger system according to claim 1, wherein said at least one array has at least one dimensional relationship comprising:
   a) external side width of said at least one substantially square cross section of said at least one heat-transfer conduit; and
   b) uniform side-to-side spacing apart of said plurality of said heat-transfer conduits of about one-half of said external side width of said at least one square cross section of said at least one heat-transfer conduit.

6. The heat exchanger system according to claim 5, wherein said external side width is about one-and one-half inches.

7. The heat exchanger system according to claim 1, wherein said at least one thermally-conductive conduit wall comprises at least one conduit wall about 0.018" thick.

8. The heat exchanger system according to claim 1, wherein said at least one thermally-conductive conduit wall comprises aluminum.

9. The heat exchanger system according to claim 1, wherein said heat-transferor further comprises at least one side constraint structured and arranged to constrain the flow of the fresh air over said heat-transfer conduits to move between first and second opposing sides of said heat-transferor.

10. A heat exchanger system, for transferring waste heat from a stream of exhaust air produced in a dryer to a stream of fresh air directed to flow into the dryer, comprising:
    a) at least one retriever comprising at least one array of at least one plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air into the dryer; and
    b) at least one structure adapted to support said at least one array of said at least one plurality of heat-transfer conduits transverse to the flow of the stream of fresh air into the dryer.

11. The heat exchanger system according to claim 10, further comprising at least one structure for assisting receiving the stream of exhaust air internal to said at least one heat-transfer conduit of said at least one retriever.

12. The heat exchanger system according to claim 10, further comprising said at least one retriever adapted to be integrated with at least one pre-existing particular dryer, wherein said at least one retriever further comprises said at least one structure integrated with said at least one array of heat-transfer conduits.

13. The heat exchanger system according to claim 10, further comprising said at least one retriever integrated with at least one particular dryer.

14. A heat exchanger system, relating to transferring waste heat from a stream of exhaust air produced in a dryer to a stream of fresh air directed to flow into the dryer, comprising the steps of:
    a) pre-configuring, responsive to customer requirements, at least one retriever comprising at least one array of at least one plurality of substantially mutually parallel, substantially vertical heat-transfer conduits having square cross-sections arrayed in alternating staggered rows relative to a perpendicular to the general direction of the flow of the stream of fresh air into the dryer, wherein each heat-transfer conduit is oriented to have one corner facing in the general direction of the flow of the stream of fresh air through said at least one retriever.

15. The heat exchanger system according to claim 14, wherein the step of pre-configuring comprises the step of determining at least one size requirement for said at least one array.

16. The heat exchanger system according to claim 15, wherein the step of pre-configuring comprises the step of perforating at least one plate with at least one pattern of a plurality of square perforations in staggered rows, each square perforation oriented cornerwise to the general direction of flow of the fresh air over said at least one plate, responsive to said at least one size requirement.

17. The heat exchanger system according to claim 16, further comprising the step of attaching said plurality of heat transfer conduits to said at least one plate, wherein each said heat transfer conduit of said plurality of heat transfer conduits is aligned and oriented to one perforation of said plurality of perforations.

18. The heat exchanger system according to claim 14, further comprising the step of attaching structural elements to at least said at least one plate, wherein said structural elements are structured and arranged to at least maintain structural integrity of said retriever.

19. The heat exchanger system according to claim 14, further comprising the step of installing said retriever in at least one dryer.

20. A heat exchanger system, relating to transferring waste heat from a stream of exhaust air produced in a dryer to a stream of fresh air directed to flow into the dryer, comprising:
   a) heat transfer means for substantially convectively transferring the waste heat to the stream of fresh air,
   b) wherein said heat transfer means comprises array means for arraying at least five rows of staggered alternating substantially vertical, substantially parallel heat-transfer conduit means for internally conducting segregated portions of the stream of exhaust air,
   c) wherein said heat-transfer conduit means comprise thermally-conductive conduit wall means for conducting heat from the segregated portions of the stream of exhaust air to the stream of fresh air,
   d) wherein said heat-transfer conduit means comprises fluid-dynamic means for influencing dynamics of the fresh air, and wherein said fluid-dynamic means comprises heat-transfer conduit means having substantially square cross-sections; and
   e) the dryer;
   f) wherein said substantially square cross-sections are oriented to have one corner of said substantially square cross-sections facing the general direction of flow of the stream of fresh air through said heat transferor.

* * * * *